United States Patent [19]

Dembo

[11] Patent Number: 5,148,365
[45] Date of Patent: Sep. 15, 1992

[54] SCENARIO OPTIMIZATION

[76] Inventor: Ron S. Dembo, 398 Markham Street, Toronto, Ontario, Canada, M6G 2K9

[21] Appl. No.: 394,081

[22] Filed: Aug. 15, 1989

[51] Int. Cl.$^5$ ............................................. G06F 15/20
[52] U.S. Cl. ................................... 364/402; 364/408
[58] Field of Search ........................ 364/402, 401, 408

[56] References Cited

U.S. PATENT DOCUMENTS

| | | |
|---|---|---|
| 4,346,442 | 8/1982 | Musmanno . |
| 4,642,768 | 2/1987 | Roberts . |
| 4,674,044 | 6/1987 | Kalmus et al. . |
| 4,694,397 | 9/1987 | Grant et al. . |
| 4,722,055 | 1/1988 | Roberts . |
| 4,744,026 | 5/1988 | Vanderbei . |
| 4,744,027 | 5/1988 | Bayer et al. . |
| 4,744,028 | 5/1988 | Karmarkar . |
| 4,752,877 | 6/1988 | Roberts et al. . |
| 4,797,839 | 1/1989 | Powell ............................... 364/554 |
| 4,953,085 | 8/1990 | Atkins ............................... 364/408 |

*Primary Examiner*—Jerry Smith
*Assistant Examiner*—Jim Trammell
*Attorney, Agent, or Firm*—Spencer, Frank & Schneider

[57] ABSTRACT

A method and apparatus are provided for optimally allocating available resources in a physical system defined by a mathematical model having parameters of uncertain values. The method comprises the steps of firstly assigning a value to each of the uncertain parameters in the mathematical model based on a scenario that may or is expected to occur. Thereafter, given the parameter values at each possible scenario, the mathematical model is solved to yield the best solution of the mathematical model for that scenario. Once this has been complete, a probability value representing the expected probability that the scenario will occur is assigned to each scenario solution. The scenario parameter values, scenario solutions and scenario probabilities are then used to determine a single solution to the mathematical model which best "fits" the desired system behavior under the uncertainty defined by all of the scenarios considered. The single solution is then used to allocate the resources in the system. The present method is particularly useful in modelling a target portfolio from a number of other financial instruments.

18 Claims, 8 Drawing Sheets

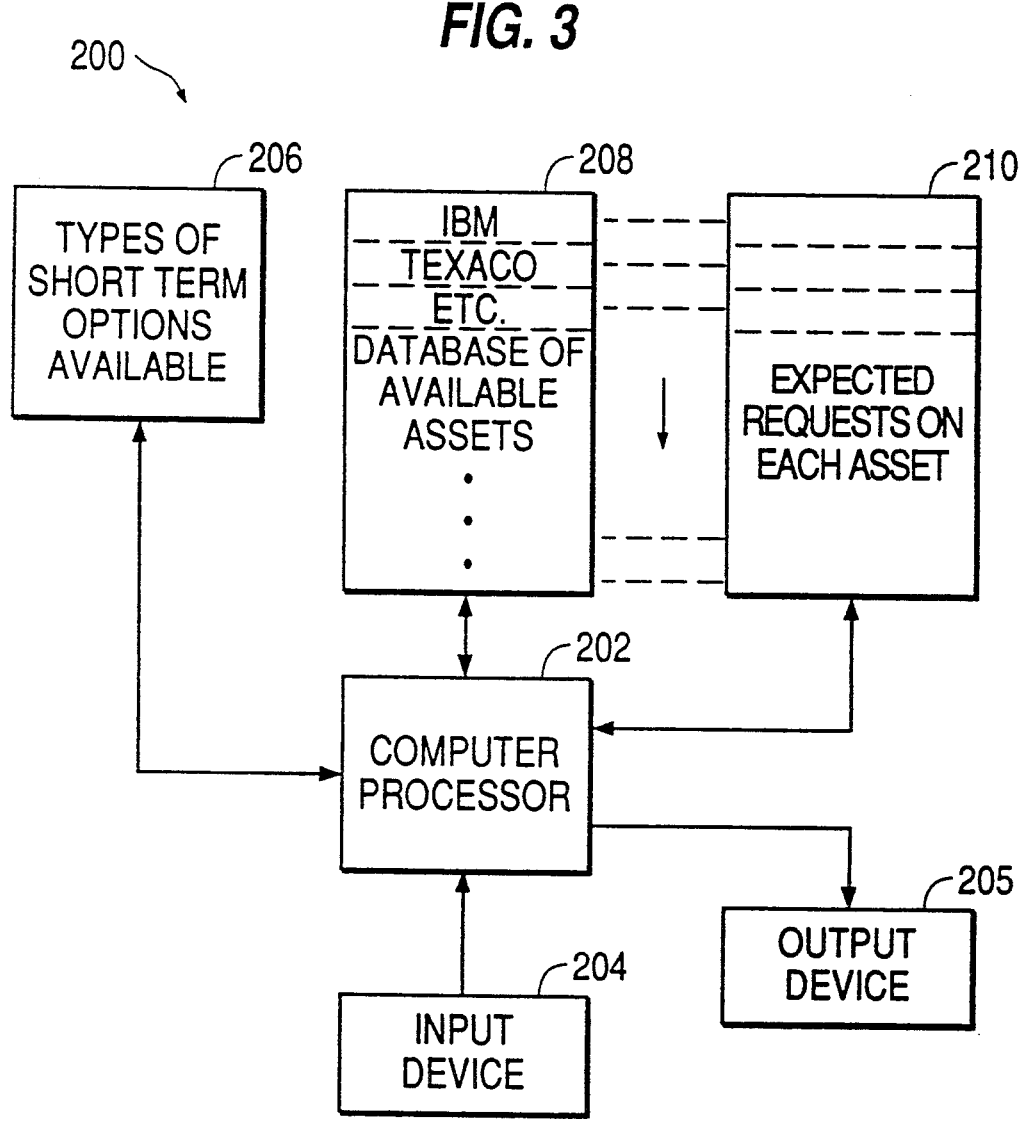

FIG. 5a

READY

| A | B | C | D | E | F | G | H |
|---|---|---|---|---|---|---|---|

ALGORITHMICS LONG-DATED OPTIONS - LOTUS DEMO USING LINEAR OPTIMIZER

|  | SCENARIOS |  | FORECAST |  | PROBABILITY |  |
|---|---|---|---|---|---|---|
| VOL.: | 80.00% | NOMINAL: | V- | 7.20% | 0.1000 | |
| | 100.00% | NOMINAL: | V0 | 9.00% | 0.6000 | 1.0000 |
| | 120.00% | NOMINAL: | V+ | 10.80% | 0.3000 | |
| | | | | | | |
| INT. RATE: | 90.00% | NOMINAL: | I- | 11.30% | 0.2000 | |
| | 100.00% | NOMINAL: | I0 | 12.55% | 0.7000 | 1.0000 |
| | 110.00% | NOMINAL: | I+ | 13.81% | 0.1000 | |

| | | | | | V- | V0 | V+ |
|---|---|---|---|---|---|---|---|
| PRICE: | 90.00% | NOMINAL: | S-- | 84.60 | 0.0000 | 0.0004 | 0.0027 |
| | 95.00% | NOMINAL: | S- | 89.30 | 0.0186 | 0.0473 | 0.0797 |
| | 100.00% | NOMINAL: | S0 | 94.00 | 0.4393 | 0.4185 | 0.3895 |
| | 105.00% | NOMINAL: | S+ | 98.70 | 0.5045 | 0.4563 | 0.4102 |
| | 110.00% | NOMINAL: | S++ | 103.40 | 0.0377 | 0.0775 | 0.1180 |

AUG-89 11:38 AM

'DESIRED LDO STRIKE PRICE : READY

| A | B | C | D | E | F | G | H |
|---|---|---|---|---|---|---|---|

DESIRED LONG-DATED OPTION SPECIFICATIONS AS OF : 06/05/89

| DESIRED LDO STRIKE PRICE : | 94 | | DAYS TO MATURITY : | 365 |
|---|---|---|---|---|
| DESIRED MATURITY DATE : | 06/05/90 | | DAYS TO ROLLOVER: | 45 |
| MAX REPLICATED OPTION COST : | 6.00% | | ROLLOVER TO MATURITY: | 320 |
| UNDERLYING SECURITY PRICE: | 95.125 | | | |
| NO. OF UNITS IN PORTFOLIO : | 1000000 | | TOTAL PORTFOLIO VALUE: | 9.51E-07 |

| | | | DATE (YR,MM,DD) | FROM TODAY | FROM ROLLOVER |
|---|---|---|---|---|---|
| ANNUALIZED DIV/INT PAYOUT : | 9.00% | | | | |
| DIVIDEND / INTEREST PAYOUT 1: | 4.50 | DUE ON | 09/01/89 | 88 | 43 |
| DIVIDEND / INTEREST PAYOUT 2: | 4.50 | DUE ON | 03/01/90 | 269 | 224 |
| DIVIDEND / INTEREST PAYOUT 3: | 4.50 | DUE ON | 09/01/90 | 453 | 408 |
| DIVIDEND / INTEREST PAYOUT 4: | 4.50 | DUE ON | 03/01/91 | 634 | 589 |
| DIVIDEND / INTEREST PAYOUT 5: | 4.50 | DUE ON | 09/01/91 | 818 | 773 |
| DIVIDEND / INTEREST PAYOUT 6: | 4.50 | DUE ON | 03/01/92 | 1000 | 955 |
| DIVIDEND / INTEREST PAYOUT 7: | 4.50 | DUE ON | 09/01/92 | 1184 | 1139 |
| DIVIDEND / INTEREST PAYOUT 8: | 4.50 | DUE ON | 03/01/93 | 1365 | 1320 |
| DIVIDEND / INTEREST PAYOUT 9: | 4.50 | DUE ON | 09/01/93 | 1549 | 1504 |
| DIVIDEND / INTEREST PAYOUT 10: | 4.50 | DUE ON | 03/01/94 | 1730 | 1685 |

AUG-89 11:38 AM

FIG. 5b

INSTRUMENTS USED TO REPLICATE LONG-DATED OPTION

| TYPE | OPTIMAL NUMBER | STRIKE PRICE | INTEREST RATE | EXPIRY DATE | IMPLIED VOL. | BID PRICE | ASK PRICE |
|---|---|---|---|---|---|---|---|
| A | B | C | D | E | F | G | H |
| ZERO BOND | 97 | 100.00 | 12.55% | 31-AUG | N/A | 97.05 | 97.05 |
| FUTURES | 0 | 95.93 | 12.55% | 31-AUG | N/A | 0.00 | 0.00 |
| PUT 1 DEC | 2654 | 92.00 | 12.55% | 15-DEC | 10.410% | 0.30 | 0.45 |
| PUT 2 DEC | 0 | 94.00 | 12.55% | 15-DEC | 11.682% | 0.75 | 0.90 |
| PUT 3 DEC | 7123 | 96.00 | 12.55% | 15-DEC | 12.726% | 1.40 | 1.60 |
| PUT 4 SEP | 10000 | 92.00 | 12.55% | 15-SEP | 7.198% | 0.05 | 0.25 |
| PUT 5 SEP | 4348 | 94.00 | 12.55% | 15-SEP | 9.187% | 0.40 | 0.60 |
| PUT 6 SEP | -2884 | 96.00 | 12.55% | 15-SEP | 10.584% | 1.10 | 1.20 |
| PUT 7 AUG | -1528 | 94.00 | 12.55% | 18-AUG | 7.345% | 0.20 | 0.40 |
| PUT 8 AUG | -10000 | 96.00 | 12.55% | 18-AUG | 9.137% | 0.90 | 1.10 |
| PUT 9 JUL | 684 | 94.00 | 12.55% | 21-JUL | 7.597% | 0.20 | 0.25 |
| PUT10 JUL | -1045 | 96.00 | 12.55% | 21-JUL | 6.553% | 0.60 | 0.80 |

MAXIMUM REPLICATED OPTION COST : 14222.63 = 0.01%
MINIMUM WTD. TRACKING ERROR SUM: 36296.56 = 0.04%

AUG-89 11:39 AM

READY

DETAILS ON INSTRUMENTS USED TO REPLICATE LONG-DATED OPTION

| TYPE | LOWER LIMIT | OPTIMAL NUMBER OF CONTRACTS | UPPER LIMIT | UNITS PER CONTRACT | HALF OF CURRENT BID-ASK SPREAD USED TO ADJUST: BID | ASK |
|---|---|---|---|---|---|---|
| A | B | C | D | E | F | G | H |
| ZERO BOND | -10000 | 97 | 1000 | 10 | 0.00 | 0.00 |
| FUTURES | -10000 | 0 | 1000 | 1 | 0.00 | 0.00 |
| PUT 1 DEC | -10000 | 2654 | 1000 | 100 | -0.08 | 0.08 |
| PUT 2 DEC | -10000 | 0 | 1000 | 100 | -0.08 | 0.08 |
| PUT 3 DEC | -10000 | 7123 | 1000 | 100 | -0.10 | 0.10 |
| PUT 4 SEP | -10000 | 10000 | 1000 | 100 | -0.10 | 0.10 |
| PUT 5 SEP | -10000 | 4348 | 1000 | 100 | -0.10 | 0.10 |
| PUT 6 SEP | -10000 | -2884 | 1000 | 100 | -0.05 | 0.05 |
| PUT 7 AUG | -10000 | -1528 | 1000 | 100 | -0.10 | 0.10 |
| PUT 8 AUG | -10000 | -10000 | 1000 | 100 | -0.10 | 0.10 |
| PUT 9 JUL | -10000 | 684 | 1000 | 100 | -0.02 | 0.02 |
| PUT10 JUL | -10000 | -1045 | 1000 | 100 | -0.10 | 0.10 |

AUG-89 11:39 AM

SCENARIO OPTIMIZATION

The present invention relates to a method of combining scenarios and in particular to a method and apparatus for optimally allocating available resources in a physical system.

Equations having parameters of uncertain value which change over time in a manner that is not readily predictable are known in the art. In fact, almost all systems in our environment which are defined by an equation have variables which vary over time and which will have values that are uncertain in the future. Solutions to these types of problems are desirable since the solutions allow resources in the system to be allocated at the present time in a manner which is most likely to conform with the expected future characteristics of the system.

For example, U.S. Pat. No. 4,744,028 to Karmarkar describes various methods for solving a linear problem to optimize the solution to the problem. In particular, this reference describes the Simplex method, the Ellipsoid method and the Karmarkar method. In these methods, an optimal solution to a linear problem is generated by fixing the value of the parameters of uncertain value in the problem and generating the optimal solution using one of the above-mentioned methods so that resources can be allocated for future needs. However, a problem exists in that the optimal solution to the problem is based on constants having a fixed value, the value of the constants being chosen in accordance with their present value or some expected value. Thus, these methods result in a solution for allocating resources for future needs based on current values or guesstimates of the parameters in the problem. No compensation is provided for possible future changes in the values of the parameters.

Finding solutions to equations having parameters of uncertain value is of particular importance in the field of portfolio management. Typically, portfolios are dependent on a variable such as interest rates which change over time. Traditionally, portfolio management techniques employ the concept of hedging to lock into a particular profit picture using futures market and cash market instruments. However, hedging methods typically preclude participation in favourable price moves of the underlying assets while providing protection from unfavourable price moves.

Demands for better portfolio performance have driven the modern portfolio manager to consider the use of insurance in providing downside protection of portfolio exposure while still allowing for continued upside participation. The most effective means of providing this insurance is with the use of options.

Generally, the insurance is desired over a time frame long enough to match the expected period of the portfolio exposure. Ideally, the portfolio manager is able to acquire options which are sufficiently long-dated so as to provide the necessary insurance over the desired time frame. Although long-dated options are available in the over-the-counter (OTC) market, the lack of liquidity and standardization for these options makes them more expensive than similar exchange traded options. However, since exchange traded options frequently have much shorter maturities than those desired for long-dated options, portfolio managers are forced to acquire such options in the OTC market.

Dynamic hedging strategies have been developed to avoid the higher costs of OTC options. These strategies involve approximating the desired option payoff at the current asset price using futures market and cash market instruments. These strategies require constant readjustment as the asset price changes and as time passes. However, problems exist in dynamic hedging in that potentially large transaction costs may be incurred over the lifetime of a particular hedge. Moreover, this strategy implicitly assumes that the market moves in a continuous manner. This of course may lead to large losses when the market experiences discrete price moves. Furthermore, another problem exists in dynamic hedging in that frequently, the assumed relationship between futures prices and cash prices in the markets breaks down which renders the hedge ineffective. Also, incorrect forecasts of volatility add to the unpredictability of transaction costs.

Recent advances in option or replication techniques have made it possible to create synthetic long-dated options that are required for portfolio insurance. The desired synthetic option is created from a combination of various cash market instruments, futures contracts and exchange traded options. These innovations make it possible to acquire the desired portfolio insurance at a much lower cost than the equivalent long-dated OTC option. The main advantages of option replication strategies over dynamic hedging strategies are significantly lower management overhead and greater predictability of transaction costs. Also, no assumptions regarding the continuity of price moves are necessary.

In addition to creating synthetic securities which may or may not exist in today's market, (i.e. long-dated options), it is also extremely important in modern finance to construct portfolios whose values track a given market index such as for example, to find a set of bonds whose value matches that of a set of future liabilities, to immunize portfolios and to hedge a given portfolio. However, current techniques do not permit the above-noted portfolio requirements to be achieved readily.

It is therefore an object of the present invention to obviate or mitigate the above-mentioned disadvantages.

According to one aspect of the present invention there is provided a method of allocating optimally available resources in a system defined by a mathematical model having at least one parameter of uncertain value comprising the steps of:

assigning a value to each of the parameters of uncertain value based on a scenario that may or is expected to occur;

solving the mathematical model for each scenario to yield the best solution of the mathematical model for that scenario;

assigning a probability value representing the expected probability that the scenario will occur to each solution of the mathematical model;

determining a single solution to the mathematical model using the values assigned to the parameters, the solutions of the mathematical model and the probabilities assigned to the solutions for all scenarios which best models the desired system behavior under the uncertainty defined by all of the scenarios considered; and allocating resources in said system based on said single solution.

Preferably, the method further comprises the step of adding constraints to the mathematical model defining the system based on operating bounds of the system prior to solving for the single solution.

According to another aspect of the present invention, there is provided a method of replicating a portfolio of financial instruments from a plurality of second financial instruments, said portfolio being defined by a mathematical model having at least one parameter of uncertain value comprising the steps of:

1) assigning a value to each of the parameters of uncertain value based on a scenario that may or is expected to occur;

2) solving the mathematical model for each scenario to yield the best solution of the equation for that scenario;

3) assigning a probability value representing the expected probability that the scenario will occur to each solution of the mathematical model;

4) determining a single solution to the mathematical model using the values assigned to the parameters, the solutions of the mathematical model and the probabilities assigned to the solutions for all scenarios which best models the behavior of the portfolio under the uncertainty defined by all of the scenarios considered;

5) selecting appropriate numbers of each of said second instruments as determined by said solution to generate a portfolio of second instruments that models said portfolio of first financial instruments.

According to still yet another aspect of the present invention, there is provided a method of replicating a long dated option from a plurality of replicating options having a term shorter than said long dated option, said long dated option being represented by a mathematical model having at least one parameter of uncertain value, said method comprising the steps of:

1) selecting the replicating options to be used to simulate the long dated option;

2) specifying scenarios by assigning values to the parameters of uncertain value based on scenarios that may or are expected to occur;

3) assigning a probability value representing the expected probability that the scenario will occur to each scenario;

4) calculating the price of the long dated option price for all of the scenarios;

5) calculating the value of the long dated option at each scenario;

6) calculating the price of the selected replicating options for all scenarios;

7) calculating the best composition of replicating options at each scenario and the cost thereof; and 8) calculating the optimum composition of replicating options of all of the scenarios to yield a portfolio of shorter term options which model the long dated option.

An apparatus for allocating resources is also provided.

The present method and apparatus provide advantages in that the allocation of resources in a system can be made at a present time in a manner which will most likely be sufficient for future needs. This capability makes the present method and apparatus particularly useful in modelling one type of portfolio including financial instruments which are either synthetic or available with other types of financial instruments that are more liquid than the type of financial instruments making up the portfolio of the one type being modeled.

Embodiments of the present invention will now be described by way of example only with reference to the accompanying drawings in which:

FIG. 3 is a block diagram of an apparatus for replicating a long-dated option;

FIGS. 5a to 5d are charts and graphs illustrating the output generated by the apparatus shown in FIG. 3.

Figure 1:
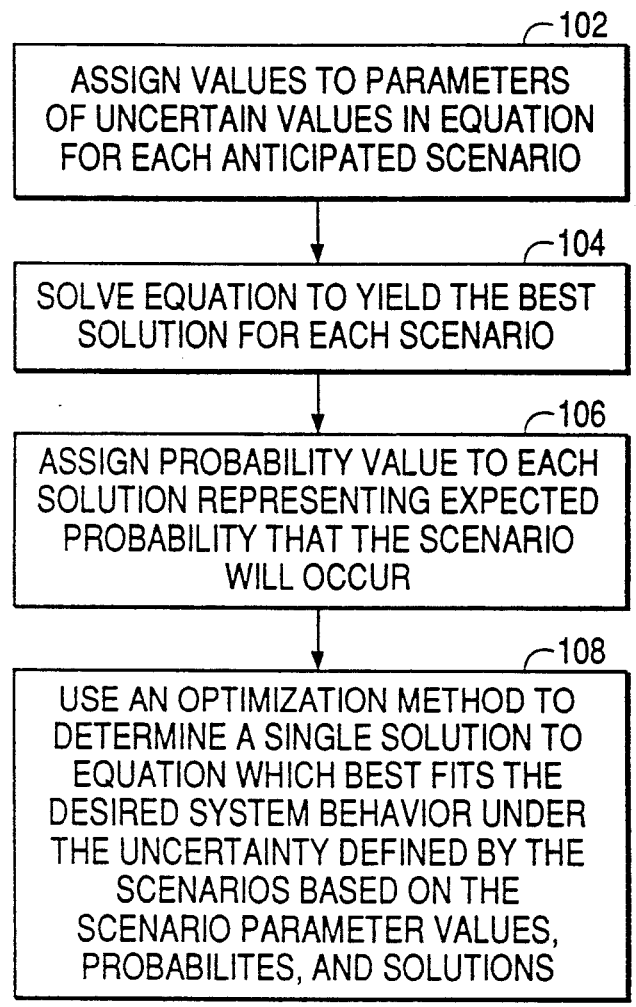
FIG. 1 is a flow chart illustrating the fundamental steps involved in the present method of optimizing the allocation of available resources in a system.

Uncertainty in the values of parameters found in mathematical programs often presents a modeler with considerable difficulties. The present method provides a simple approach to solving stochastic models based on a particular method for combining scenario solutions to generate a single feasible policy. The present method is computationally simple and easy to understand and because of its generality, the present method is capable of handling multiple competing objectives, complex stochastic constraints and may be applied in other contexts other than optimization.

For clarity, a description of the underlying principles on which the present method is based is provided and is exemplified by the following stochastic problem provided below.

Consider linear optimization problems of the form:

$$\begin{aligned} \text{Minimize} \quad & c^T x \\ \text{subject to} \quad & Ax = b \\ & x \geq 0 \end{aligned} \quad (1)$$

In many situations a large portion of the data may be uncertain, that is dependent on future events. To represent this situation, the above representation (1) is refined to take the form of a stochastic linear program shown below:

$$\begin{aligned} \text{Minimize} \quad & c_u^T x \quad \text{(``uncertain objective'')} \\ \text{subject to} \quad & A_u x = b_u \quad \text{(``uncertain constraints'')} \\ & A_d x = b_d \quad \text{(``deterministic constraints'')} \\ & x \geq 0 \end{aligned} \quad (2)$$

An extremely powerful, convenient and natural way to represent uncertainty in mathematical models is through the use of scenarios. In the present method, a mathematical model is defined as a system of equations and inequalities, possibly coupled with a function describing one or more objectives, that may either be represented algebraically or embodied in a computer simulation. For the purpose of the present method, a scenario is defined as a particular realization of the uncertain data in the equation, $c_u$, $A_u$ and $b_u$, represented by $C_S$, $A_s$ and $b_s$ respectively. In other words, it is the assignment of values to the uncertain parameters in the mathematical model defining the system usually at some point of time in the future.

Thus, for each scenario s where s is in S={set of all scenarios}, the above linear program (2) reduces to the deterministic problem below.

$$v_s \equiv \text{Minimize} \quad c_s^T x \quad (3)$$
$$\text{subject to} \quad A_s x = b_s$$
$$A_d x = b_d$$
$$x \geq 0$$

wherein $x_s$ denotes the solution to problem (3).

Associated with each scenario is a probability $p_s$ having a value based on the likelihood that the particular scenario is going to occur. In a dynamic situation, the probabilities will change over time, i.e. $p_s(t)$. In certain instances, the exact nature of the underlying stochastic process may be known. However, more often the exact nature of the process will not be known and thus, the solution to the problem (3) defining the process will have to be revised periodically. In stochastic programming techniques, it is typical for one to assume that all uncertain parameters are known a priori in terms of some distribution or stochastic process. This information is then used to make a decision at a present time that is in some sense valid for all future times. The present method however assumes a priori that solutions to the problem (3) will have to be revised in light of future changes to probability estimates. This implies a rolling horizon or control framework in which the probability estimates are estimated and the solution to the problem (3) is revised when significant changes occur.

Consider a stochastic linear system in the form:

$$A_s x = b_s, \; s \in S; \quad (4)$$
$$A_d x = b_d;$$
$$x \geq 0$$

The system (4) is said to be (norm) feasible if the system satisfies the deterministic constraints $$A_d z = b_d, \; Z \geq 0 \text{ and minimizes } \Sigma_s p_s \| A_s x - b_s \|. \quad (5)$$

This definition is constructive in that it indicates a reasonable way in which scenario solutions may be combined into a single feasible solution to the underlying stochastic programming problem. An optimal solution to a single scenario problem can be expressed as a solution to a stochastic linear system simply by including the inequality $c_s^T x = v_s$. For example, one possible co-ordinating model may be:

$$\text{Minimize} \quad \Sigma_s p_s \| c_s^T x \cdot v_s \|^2 + \Sigma_s p_s \| A_s x - b_s \|^2 \quad (6)$$
$$\text{subject to} \quad A_d x = b_d$$
$$x \geq 0.$$

As should be apparent from the co-ordinating model, the term $\Sigma_s p_s \| A_s x - b_s \|^2$ (tracking term) minimizes error between the system (4) and the single solution over all weighted scenarios while the term $\Sigma_s p_s \| c_s^T x - v_s \|^2$ (objective term) minimizes errors in an objective of the solution to the system.

In this example, the co-ordinating model (6) tracks the scenario solutions as closely as possible while still maintaining feasibility, although not strictly in the sense of the above definition (6), i.e. the norm squared is being minimized and not the norm itself. For this reason the above co-ordinating model (6) is referred to as a tracking model. The co-ordinating model (6) is very flexible in that it may include many additional objective terms or constraints.

In addition to the co-ordinating model (6) shown above, other co-ordinating models can be used to determine the best solution to the system over all of the scenarios. These co-ordinating models include a norm minimization model shown below:

$$\text{Minimize} \quad \Sigma_s p_s(|c_s^T x - v_s| + |A_s x - b_s|) \quad (7)$$
$$x \geq 0$$
$$\text{subject to} \quad A_d x = b_d.$$

where $| \ldots |$ denotes any Euclidean norm which may be represented by the linear program:

$$\text{Minimize} \quad \Sigma_s p_s[(y_c^+ + y_c^-) + e^T(y_s^+ + y_s^-)] \quad (8)$$
$$y^+, y^-, x \geq 0$$
$$\text{subject to} \quad A_d x = b_d;$$
$$A_s x - b_s - (y_s^+ - y_s^-) = 0, \; s \in S;$$
$$c_s^T x - v_s - (y_c^+ - y_c^-) = 0, \; s \in S.$$

Moreover, the co-ordinating model may have constraints that are not present in the scenario subproblem and thus, if there are multiple objections to minimize, such as:

$$(c_s^1)^T x, (c_s^2)^T x, \ldots, (c_s^m)^T x \quad (9)$$

the co-ordinating model shown below can be used to determine the best solution to the system:

$$\text{Minimize} \; \Sigma_s p_s(|(c_s^1)^T x - v_s^1| + |(c_s^2)^T x - v_s^2| + \ldots + \quad (10)$$
$$x \geq 0 \quad |A_s x - b_s|)$$

where $v^1_s, v^2_s, \ldots$ are the values taken on by these objectives under scenario s.

To summarize the above approach to scenario optimizing stochastic programming models and with reference to FIG. 1, the present method comprises generally two stages, namely (i) computing a solution to a deterministic problem under all scenarios and assigning a probability value to each solution (blocks 102, 104 and 106); and (ii) solving a co-ordinating or tracking model to find a single feasible policy to the problem (block 108).

The problem referred to in stage (i) may be linear, non-linear, or even an integer programming model.

For example, if a non-linear stochastic system is chosen having the form:

$$f(x;r) \geq 0; \; x \in X; \quad (11)$$
where
$$f(\cdot;r): R^n \to R^m; \; x \in R^n;$$
and
$r \in R^q$ is a vector of random parameters.
Assume:
$r_s$ is the value of $r$ under scenario $s \in S;$
$S$ is a finite set of all possible scenarios;
$p_s(t)$ is the probability of scenario $s \in S$ at time $t;$
and
$x_s$ satisfies $f(x_s;r_s) \geq 0;$ the co-ordinating model shown below would be taken to find the best solution to the problem (11) over all of the scenarios:

Given $r_s, p_s(t)$ $s \in S$;  (12)
(Scenario Subproblem) Compute $x_s$ satisfying $f(x_s;r_s) \geq 0$, $s \in S$;
(Tracking Problem) At time $t$, compute a policy $x^*(t)$ satisfying $$v(t) = \underset{x \in X}{\text{Minimize}} \Sigma_s p_s(t) \| f(x;r_s) - f(x_s;r_s) \|.$$

The problem referred to in stage (i) may also be a system of equations with stochastic coefficients or any function depending on stochastic parameters. Since, by definition for an assumed scenario, this problem is deterministic, in principle, a solution can be found using known algorithms and various optimization techniques. In an overview, the first stage may be viewed as a sampling of the solution space based on the underlying stochastic model while the second stage involves finding a single feasible policy that best "fits" the behavior of the system under uncertainty. In the second stage it may be desired to track only a particular function of the system variables and constraints may be added to the system. This of course is permitted in the present method.

Figure 2:
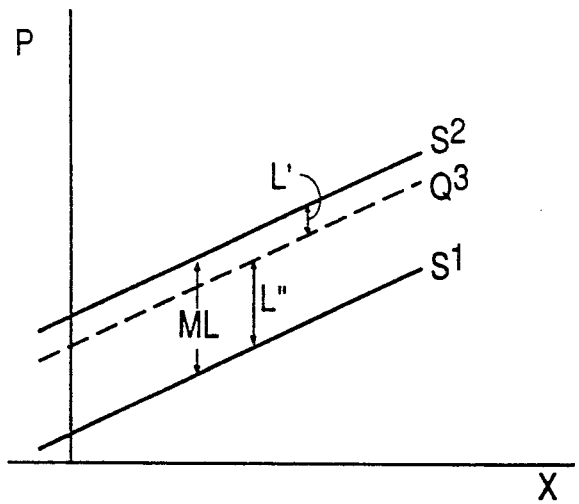
FIG. 2 is a graph illustrating the operation of the present method.

Consider the very simple example illustrated in FIG. 2. Let P, the mathematical model or problem equal AX+B, wherein A and B are parameters of uncertain value. Let $S^1$ be the solution to the mathematical model for one possible scenario fixing the values of the parameters A and B. Let $S^2$ be a solution to the mathematical model for another possible scenario fixing the values of A and B. Now, if the probability of scenario $S^1$ or $S^2$ were known with 100% certainty decisions would be made to operate a system modelled by the mathematical model in accordance with the parameters defining each of these scenarios. However, since there is a probability that either scenario $S^1$ or scenario $S^2$ may occur, operation of the system modelled by the mathematical model in accordance with one of the two scenarios may yield error.

For example, if the distance between the two scenarios $S^1$ and $S^2$ represents possible losses in a system and the system is operated in accordance with scenario $S^1$ and scenario $S^2$ occurs, the maximum loss ML will occur. Similarly, if the system is operated in accordance with scenario $S^2$ and scenario $S^1$ occurs, the maximum loss ML still occurs. Now if we consider a system in terms of the probabilities that each of these scenarios will occur, a feasible single solution $Q^3$ to the problem P can be found.

For example if scenario $S^1$ has a probability $p_s$ equal to 0.2 of occurring and scenario $S^2$ has a probability of $p_s$ 0.8 of occurring, by finding the optimal solution of the equation P for each scenario factored by the probability, a solution $Q^3$ as shown by the dotted line can be found using the co-ordinating model(s). Accordingly, by operating the system in accordance with solution $Q^3$, if scenario $S^2$ occurs the loss involved is small with respect to the maximum loss ML. Similarly, the loss $L''$ between scenario $S^1$ and scenario $S^2$ is less than that of a loss ML. Accordingly, in the unlikely event that scenario $S^1$ occurs, the maximum foreseeable loss $L''$ is less than the loss that would occur if the system was operated in accordance with scenario $S^2$. Thus, by operating the system in accordance with solution $Q^3$, a single policy of operating the system can be chosen which tracks the most likely scenario yet hedges against loss if another scenario occurs. Although this is a simple example, the underlying principle of the present method is illustrated.

As should be apparent, this method of finding a solution to a problem defined by a mathematical model having uncertain parameters so that resources may be allocated optimally in the present to meet expected future needs is useful in a variety of applications as will be described hereinafter.

Figure 4A:
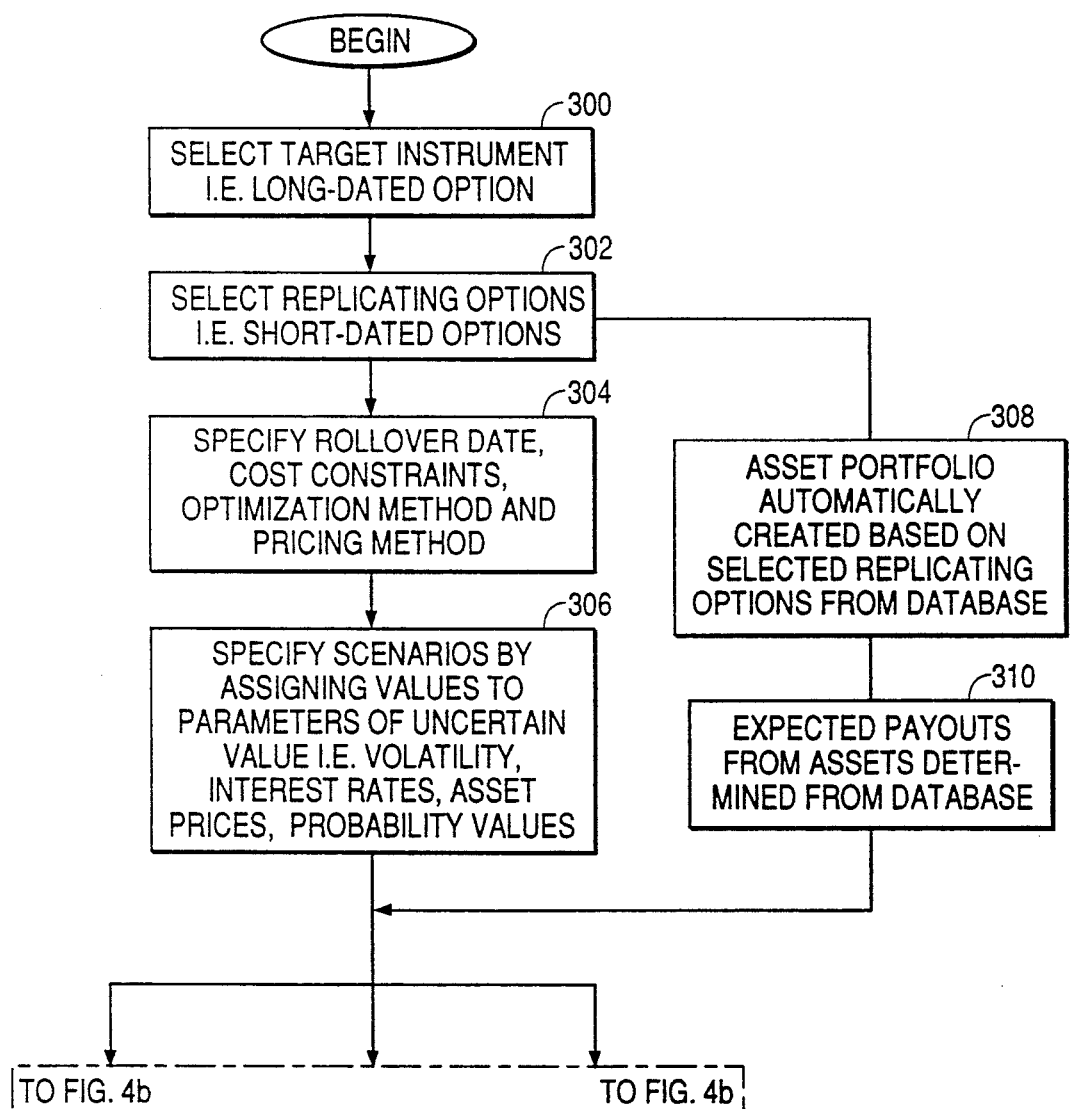
FIGS. 4a to 4c are flow charts illustrating the operation of the apparatus shown in FIG. 3.
Figure 4B:
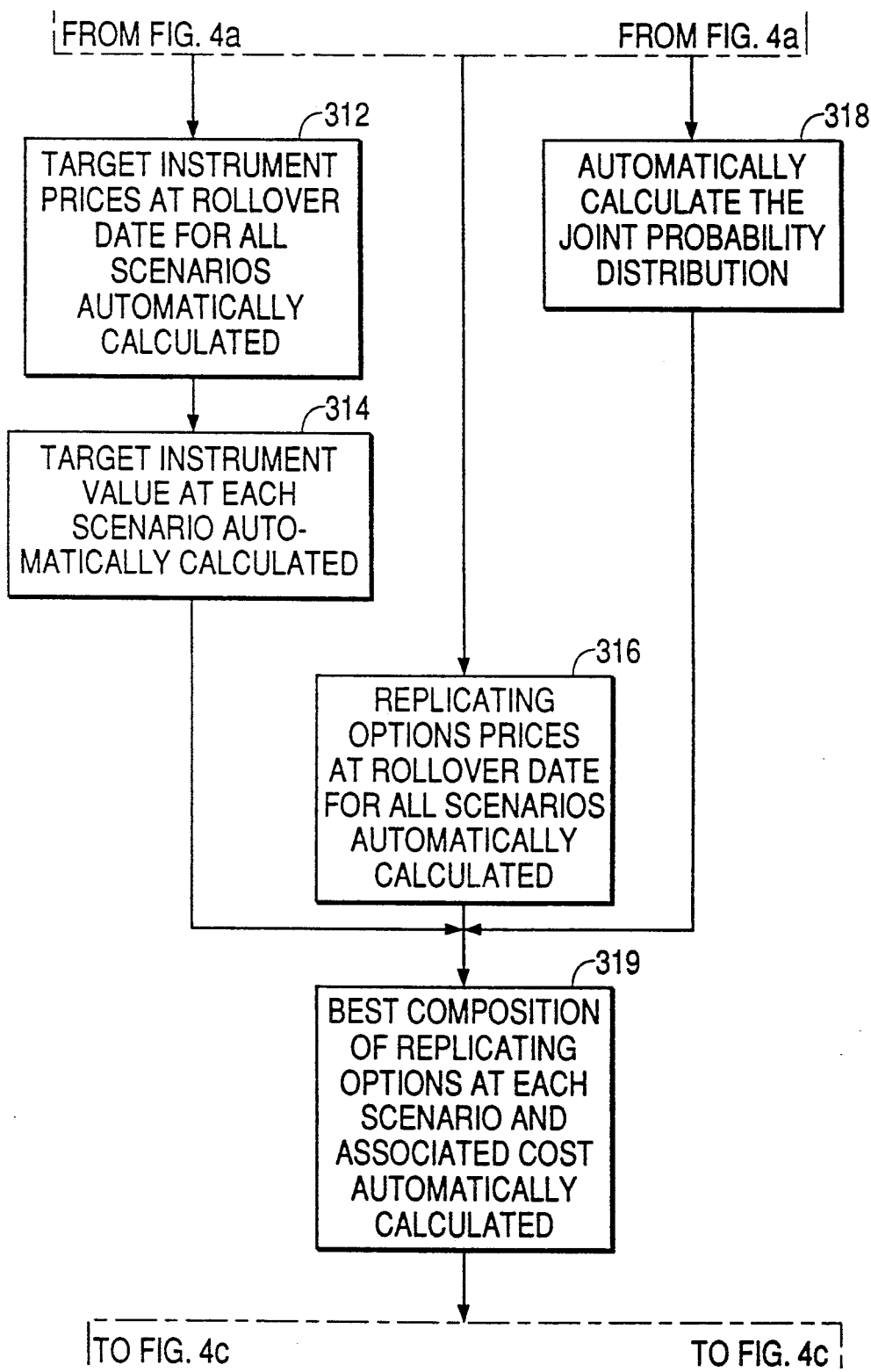
Figure 4C:
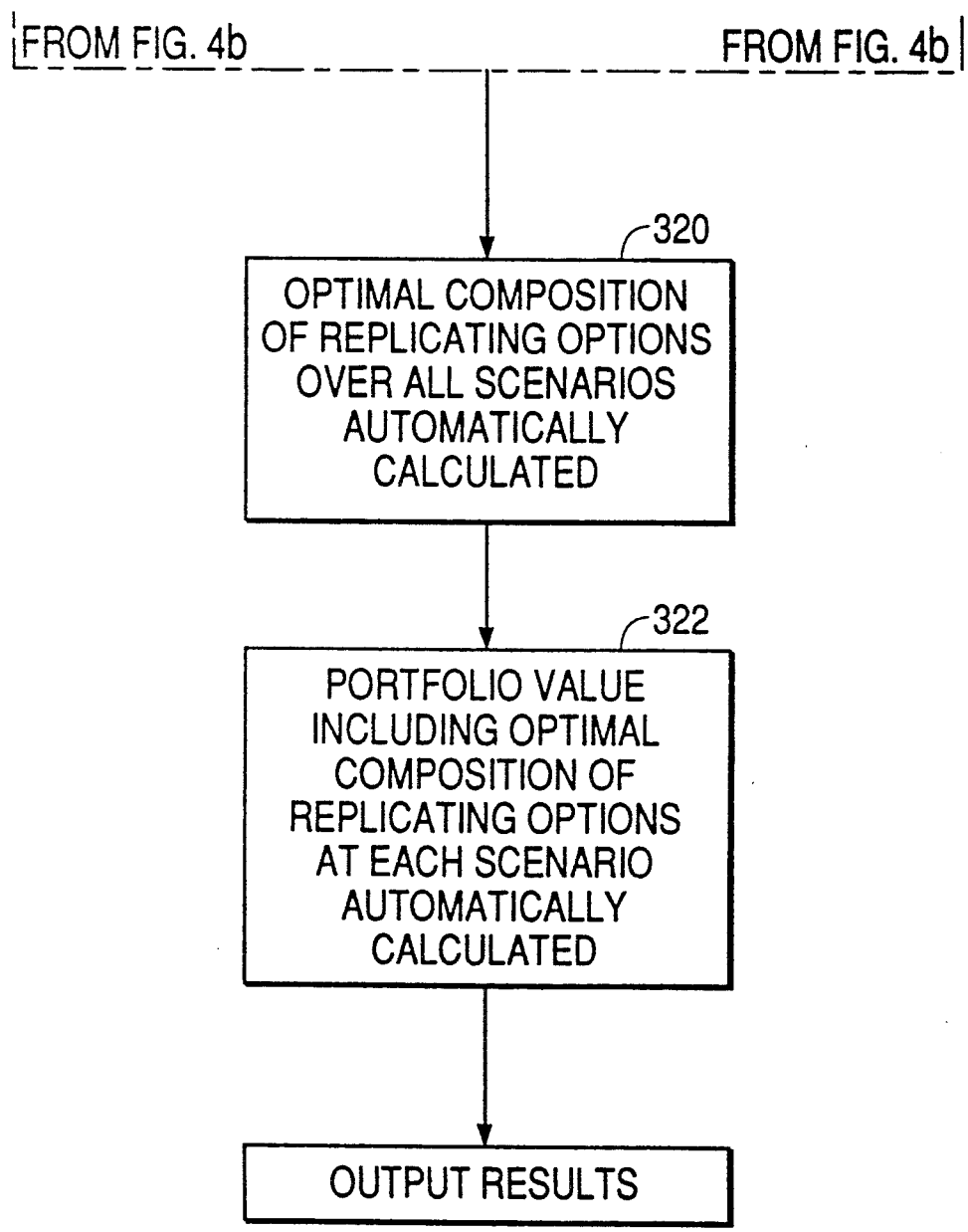

The above described principles of the present method are particularly useful in portfolio management wherein it is often desired to model one portfolio of financial instruments using another portfolio of financial instruments. Referring now to FIGS. 3 and 4, a system 200 for creating a long-dated option from a combination of short term options is shown. As can be seen, the system 200 comprises a computer 202 having an input device 204 for allowing a user, in this case a portfolio manager, to select the long-dated option that is to be modelled and the types of short term options that are to be used to model the long-dated option. The computer 202 also includes an output device 205 for displaying the short term options selected to model the long-dated option.

The computer 202 is in communication with a number of databases 206 to 210 which store information relating to the various types of short term options that are available in today's market, (i.e. 3 months, 6 months, etc.), the underlying assets available for each type of short term options, (e.g. IBM shares, Texaco shares, etc.), and expected payouts on any of the assets (i.e. dividends payable). The databases 206 to 210 can be updated as additional types of options and assets become available to enhance the user's selection of short term options.

Software is provided in the computer which allows the user to select the target long-dated option to be replicated (block 300) and the short term options to be used to replicate (block 302) the long-dated option behavior. The software also permits the rollover date of the synthetic long-dated option to be specified, any cost constraints by which the replicating portfolio must be bound, the pricing method to be used to value the underlying asset and the optimization or co-ordinating model to be used to determine the best composition of short term options for simulating the long-dated option behavior (block 304). The optimization method or co-ordinating model is chosen from one of the equations 6 to 10. Scenarios with respect to interest rates, volatility and asset prices can be specified by the user along with the associated probability values that the scenario will or is expected to occur (block 306). The scenarios and probabilities are selected based on the expected values of the uncertain parameters. For those of skill in the art of portfolio management, the probability of the various scenarios can be guesstimated with reasonable accuracy based on experience.

Once this information is entered into the computer by the user, an asset portfolio is created using the replicating options (block 308) and the database 210 is examined to determine if any payouts are expected on the selected replicating options (block 310). This permits the value of the portfolio of replicating options to be determined and is useful when portfolio cost constraints are used when determining the number of each replicating option to be used to model the long-dated option. Thereafter, the processing software performs calculations based on the entered data to select a combination of the selected short term options that will most closely model the long-dated option.

These calculations include calculating the long-dated option value price at the rollover date for all scenarios and the long-dated option value at each scenario (blocks 312 and 314). The short term option values at the rollover date for all scenarios are also calculated (block 316) along with the joint probability distribution of the scenarios (318). The joint probability arises when more than one parameter of uncertain value is fixed to solve the equation for a scenario since each fixed value will have a probability associated therewith. Thus, the probability value of the scenario will be equal to the product of the probability values assigned to each of the fixed parameters.

Once these steps have been performed, the best composition of short term options at each scenario and their associated cost are calculated (block 319) and the optimal composition of short term options over all of the scenarios is selected so that the replication portfolio will model the target portfolio over the selected scenario and selected co-ordinating model (block 320). The replication portfolio value including the selected composition of short term options is then calculated at each scenario (322). The processing software selects the short term options based on the optimization or co-ordinating method chosen and any constraints specified and then operates in accordance with the scenario optimization method described previously.

Since the options used in the replication are less than one year, one or more rollover dates occur within that year. At time t=rollover, a new portfolio of options must be purchased to replace the previous portfolio of options which will expire at the rollover date; knowing the curvature of the long-dated option (LDO) at time t=rollover based on a fixed interest rate and a fixed volatility, the corresponding LDO values can be determined to a chosen range of underlying asset values. The chosen co-ordination model is then used to select the quantity of each selected option to replicate the LDO values at the rollover date for each underlying asset value chosen; the selected options also have similar curvatures representing the option values.

Figure 5C:
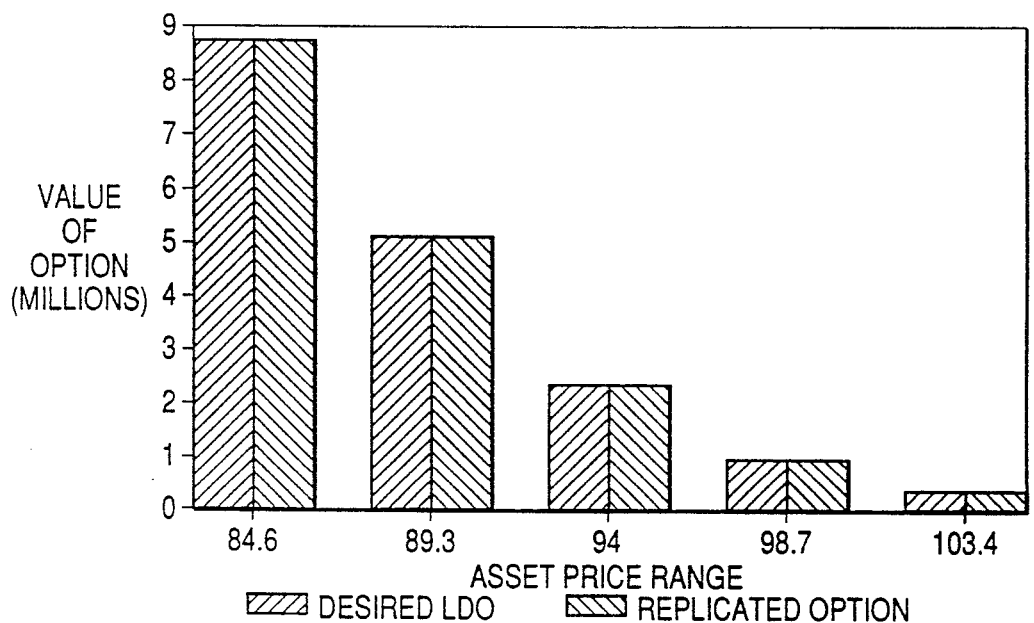

FIGS. 5a to 5d show the results of the present method when used to replicate a long-dated option from a number of short term options. In particular, FIG. 5a illustrates scenarios chosen for volatility, interest rates and price of a particular option. This information is used as previously described to calculate the optimal synthetic long-dated option as shown in FIG. 5b. In order to replicate the long-dated option, the instruments listed in FIG. 5c are considered in order to yield the best combinations and quantities to replicate the long-dated option. The selected quantities and short term options to replicate the desired long dated option are illustrated in FIG. 5c.

Figure 5D:
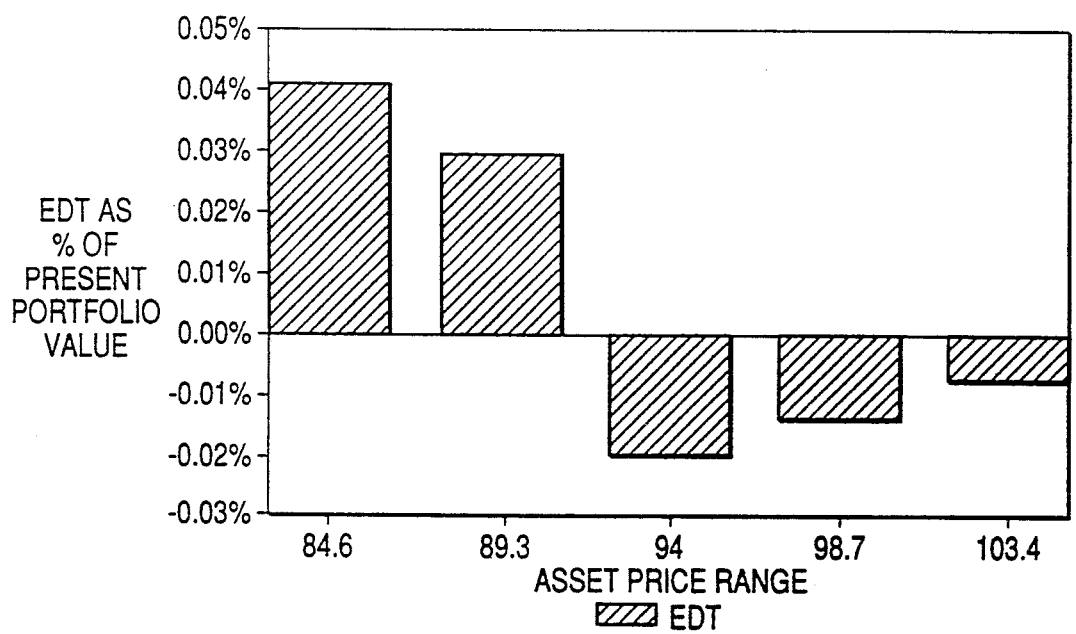

FIG. 5d graphically illustrates the effectiveness of the replication by showing a comparison between the desired long-dated option and the portfolio of short term options replicating the long-dated option.

An alternative to only considering replicating options with the same expiry date is to incorporate options with different expiry dates. This provides the advantage of reducing the administration time and costs of the LDO at each rollover date. If all the options in the replicating portfolio have one expiry date (e.g. 3 months) then the entire portfolio must be rolled over by the expiry date. An alternative is to incorporate options with various expiry dates (e.g. 3 months, 6 months, 9 months) which the co-ordinating model can accommodate. As time progresses and the first rollover date arrives (e.g. 3 months), the expiring options are replaced and the unexpired options merely have reduced time to expiry (e.g. a 9 month option at time t=0 becomes a 6 month option at time t=rollover for a 3 month option). Although it may appear that it is only possible to use this strategy where the interest rates and volatility are known with reasonable certainty, their inclusion can be effective as the use of probabilities allows the user to attach an appropriate weighting to these forecasts and hence, allows these possibilities to be included in the replication decision even where there is uncertainty regarding such interest rates and volatility forecasts.

Although, the present method has been described for use in simulating a long-dated option from a plurality of short term options, the present method may also be used to replicate any portfolio using a portfolio of related liquid instruments. For example, consider the portfolio immunization problem wherein it is desired to find the cheapest set of fixed income securities, in this case bonds, whose present value over some time period is equal to the present value of a given portfolio, usually a stream of liabilities.

A deterministic formulation of this problem has the general form:

$$v_s = \text{Minimize} \quad c_s^T x \quad (13)$$

$$\text{subject to} \quad 0 \leq x_j \leq u_j, \text{ for all } j \in J$$

$$\sum_{j \in J} PV_{sj} x_j \geq PV_{sT}$$

where:

$PV_{sj}$ = Present Value of Bond $j$ under discount scenario $s$ $PV_s(x) = \sum_{j \in J} PV_{sj} x_j$; Present Value of portfolio $x$ under discount scenario $s$ $PV_{sT}$ = Present Value of liability (Target) portfolio under discount scenario $s$ $x_j$ = amount of Bond $j$ in the optimal immunizing portfolio $c_j$ = the current vector of Bond market price $u_j$ = maximum units of Bond $j$ allowed $l_j$ = minimum units of Bond $j$ allowed $J$ = set of Bonds $j$ available for immunizing The uncertainty in problem (13) stems from the present value co-efficients, $PV_{sj}$. These fluctuate as interest rates and hence, discount rates change over time. The deterministic problem (13) above, which assumes a single scenario s, is very easy to solve. However, notice that since it is a knapsack problem, if the bonds $u_j$ are large enough, the solution will contain only one bond, regardless of the scenario chosen. Moreover, the optimal immunizing bond will typically be different for different scenarios.

It is clear that such a solution is not satisfactory since it is likely that the selection of one bond will track poorly if the assumed discount scenario does not occur. An "optimal" solution can only be expected if a diverse portfolio is chosen in order to hedge against the uncertain future long and short-term interest rates. Notice also that whereas a solution to any single scenario subproblem does not appear to offer a good solution to the immunization problem, one may be able to solve many such problems inexpensively making portfolio immunization a good candidate for scenario optimization.

In current practice in order to improve this situation, additional constraints are added to the deterministic immunization model and arbitrary bounds are placed on the variables so as to guarantee a diversified portfolio of bonds in the solution. Prescribing a solution, however, is not considered good modelling practice. In contrast, the stochastic model as shown above in a scenario optimization framework is quite simple and naturally provides a diverse portfolio. The resulting solution is likely to track the present value of the liabilities over time without the need for significant rebalancing under many realizations of the future discount scenarios.

The scenario optimization approach calls for the solution of the deterministic sub-problems under each possible scenario. For reasonable choices of the bonds $l_j$ and $u_j$ the scenario sub-problem solution, $x_s$ will always satisfy:

$$PV_s(x) = PV_{sT}. \tag{14}$$

Thus, one possible tracking or co-ordinating model could be:

$$\text{Minimize}_{x} \sum_{s \in S} p_s[(c_s^T x - v_s)^2 + (PV_s(x) - PV_{sT})^2] \tag{15}$$

$$\text{subject to } 0 \leq x_j \leq u_j; \text{ for all } j \in J$$

where $V_s$ is the optimal portfolio cost under scenario s and $p_s$ is the probability of scenario s occurring. If the cost of constructing the immunizing portfolio is an issue, the above model can be further enhanced by including a constraint that limits cost. Let C be the total budget available for constructing the immunizing portfolio. A tracking model of great interest would then be the following parametric quadratic programming problem.

$$Q(C) = \text{Minimize}_{x} \sum_{s \in S} p_s[(c_s^T x - v_s)^2 + (PV_s(x) - PV_{sT})^2] \tag{16}$$

$$\text{subject to } 0 \leq x_j \leq u_j; \text{ for all } j \in J$$

$$\sum_{j \in J} c_j x_j \leq C.$$

In this model, one can explicitly examine the trade off between the cost of the immunization and its quality, Q(C) as measured by the error in tracking the scenario solutions. This cost versus "risk exposure" tradeoff is extremely useful in commercial applications of portfolio immunization.

Another application of the present method occurs in hydroelectric power scheduling and reservoir planning models. The optimal management of reservoirs is an important problem faced by any hydroelectric power utility or any large governmental water authority. In terms of modeling, it is an application area in which the random nature of reservoir inflows plays a critical role in determining the operating policy of the utility. Primary sources of uncertainty in such problems are the quantity and timing of future water inflows into the reservoir system and in the case of hydroelectric applications, the demand for electricity.

In applications involving the generation of hydroelectric power, it is typically desired to determine reservoir levels and releases over time that maximize the benefit of using hydro to replace costly thermal generation. An example of a long-term hydroelectric scheduling model using the present method is given below:

$$\text{Maximize}_{V, R, S} \sum_{t=1}^{T} \sum_{j=1}^{J} B_{tj}(v_{t-1,j}, V_{tj}, R_{tj}) \tag{17}$$

subject to $$V_{tj} - V_{t-1,j} - \sum_{k \in K_j} (R_{tk} + S_{tk}) + R_{tj} + S_{tj} = I_{tj}$$

$$\underline{V}_{tj} \leq V_{tj} \leq \overline{V}_{tj}$$
$$\underline{R}_{tj} \leq R_{tj} \leq \overline{R}_{tj}$$
$$0 \leq S_{tj} \text{ for all } t = 1, \ldots, T \text{ and } j = 1, \ldots, J.$$

Where

B(.) is a stochastic nonlinearfunction measuring the benefit of hydro vs. thermal generation;

$V_{tj}$ is the volume of reservoir j at the end of period t;

$\overline{V}$ and $\underline{V}$ are given upper and lower limits on V;

$I_{tj}$ is the net (siochastic) inflow to reservoir j in period t; that is, the difference between the inflow and water extracted for irrigation;

$R_{tj}$ is the release (for generation) from reservoir j in period t; $\overline{R}$ and $\underline{R}$ are upper and lower limits on R;

$S_{tj}$ is the amount split from reservoir j in period t; strictly speaking $S \geq 0$ only when V is at its upper bound; and $K_j$ is the set of reservoirs immediately upstream from reservoir j.

Randomness in the above-mentioned model occurs in two variables, namely via the net inflows $I_{tj}$ which are not known with certainty especially in future periods and via the benefit function B(−) which is constructed using a least squares fit to a set of data generated by simulating thermal energy costs using forecasts of the electricity demand.

This application is a good example of a case in which even if accurate estimates of the historical distributions of inflows are available, it is difficult to conceive of a model that will produce a single policy that will be valid over a long period of time. Instead, it is more reasonable to assume various scenarios based on perhaps historical data that are known together with estimates of the probability of each of these scenarios occurring. In terms of the model constructed using the present method, a single scenario is defined as a set of inflows into the reservoir coupled with the electricity demand level for each time period in the model. Using the present method, the above hydro scheduling model can be written as:

$$\text{Minimize } f(x) \tag{18}$$
$$\text{subject to } Ax = b$$
$$1 \leq x \leq u.$$

Let s index a particular scenario chosen from the set of all scenarios S. Thus, $f_s(X)$ and $b_s$ denote the objective function in the right hand side of this model under scenario s. In this case the co-efficient matrix is deterministic. To determine these scenarios, at the heart of any reservoir management system is a hydrological forecasting model usually fed by an extensive relational data base of historic hydrological data. Such a database contains for example, twenty years of information on:

(i) individual hydro plants, reservoirs and river basins;
(ii) topological data on the aquifer feeding the reservoirs;
(iii) level/volume surface table;
(iv) historical flood data; and
(v) daily data on turbine operation, spillage, pumping, etc. for each hydro plant.

Short term planning models use forecasts to generate inflow scenarios. In the long term, model inflow scenarios are generated based on historical data. An inflow scenario is a time series of inflows for a particular reservoir system, corresponding to the duration and periods of the relevant study. For example, in the long term model, an inflow scenario could be a set of weekly inflows into the reservoirs over the years. Each inflow scenario is artificially constructed from the database so that the auto correlations between periods correspond to those observed historically. Just as in the portfolio immunization where the scenarios might have to satisfy a no arbitrage condition, in this case the strong correlation between the inflows in any pair of consecutive months must be respected.

An inflow scenario is also specified according to the degree of inflow level, for example, the scenario "75% dry" could indicate that with a probability of 75% the historically observed inflows are greater than or equal to the ones selected in the scenario. Similarly, a scenario "80% wet" indicates that weekly inflows selected in addition to satisfying the auto correlation constraints are greater than or equal to the historically observed ones 80% of the time and are within the same ranges as the observed values.

Scenario optimization requires one to assign probabilities to these possible scenarios. The assigned scenarios may be purely subjective. For example, if the year has so far been very dry, then a high probability to it remaining dry for the next month may be assigned. Experimentation with various combinations of other scenarios such as for the next two months "dry 80% with probability 0.9", "dry 60% with probability 0.1" and for all subsequent months, "wet 50% with probability 0.5", "dry 75% with probability 0.5" etc. This allows solutions to the problem defining the operation of the utility in various scenarios to be generated to allow a single usable policy to be chosen for operating the hydroelectric generating station in accordance with the predicted inflows and electricity demands while minimizing error in the event that the inflows and demands are different than those predicted at a future date. Thus, the allocation of resources can be made at a present time which is valid for the future based on expected scenarios.

Although, the present method has been described for use in creating long-dated options, immunizing portfolios and determining a policy to operate a hydroelectric station, it should be apparent to one of skill in the art that the present method of determining a single policy can be used in any system where resources need to allocated or modelled provided the system is defined by a mathematical model having at least one parameter of uncertain value.

It should be apparent to one of skill in the art that when determining the single solution to the problem based on co-ordinating or tracking models, various known optimizing techniques can be used. It should also be apparent that the present method and system are flexible and provide a framework to solving problems to enhance resource allocation which is very flexible.

It should also be apparent to one of skill in the art that the present method and apparatus can be used in any system which is defined by a mathematical model having uncertain parameters that vary over time.

We claim:

1. A system for allocating available resources in a physical system defined by a mathematical model having at least one parameter of uncertain value to satisfy uncertain levels in a set of demands on said available resources and meet a predetermined set of objectives based on foreseeable future changes of said levels, said system comprising:
   resource allocation determining means having input means and memory means, said resource allocation determining means:
   i) receiving values for said at least one parameter of uncertain value based on scenarios of said set of demands that may or are expected to occur via said input means;
   ii) solving the mathematical model using said values for said at least one parameter for each of said scenarios to yield a best scenario solution of that mathematical model for each scenario;
   iii) receiving a probability value for each scenario solution, said probability value representing the likelihood that the scenario will occur;
   iv) determining a single solution to the mathematical model which best tracks the desired system behavior under all possible scenarios relative to the probabilities assigned to the scenarios;
   output means connected to said resource allocation determining means, said output means providing a physical indication as to how the available resources should be allocated in said physical system based on said single solution to satisfy said set of demands and meet said set of objectives; and
   means for adjusting the physical system in accordance with the physical indication.

2. A system as defined in claim 1 wherein said set of objectives are variable, said resource allocation means allowing said set of objectives to be entered therein via said input means and storing said set of objectives in said memory means.

3. A system as defined in claim 2 wherein said resource allocation determining means further places predetermined additional constraints on the mathematical model defining the physical system prior to performing step iv), said constraints being based on operating bounds of the physical system.

4. A system as defined in claim 3 wherein said resource allocation determining means determines said single solution by minimizing a co-ordinating or tracking function.

5. A system as defined in claim 4 wherein said co-ordinating or tracking function further includes an objective term and wherein said resource-allocation-determining-means determines said single solution also by minimizing said objective term.

6. A system as defined in claim 5 wherein said tracking function is of the form $$\text{Minimize} \quad \Sigma_s p_s(c_s^T x - v_s)^2 + \Sigma_s p_s \|A_s x - b_s\|^2$$
$$\text{subject to} \quad A_d x = b_d$$
$$x \geq 0$$

and is minimized by said resource allocation determining means.

7. A system as defined in claim 5 wherein said coordinating model is of the form $$\underset{x \geq 0}{\text{Minimize}} \quad \Sigma_s p_s(\|c_s^T x - v_s\| + \|A_s x - b_s\|)$$
$$\text{subject to} \quad A_d x = b_d$$

Where $\|..\|$ denotes any one or two sided norm and is minimized by said resource allocation determining means.

8. A system for replicating a target portfolio of financial instruments using a plurality of second financial instruments, said target portfolio being defined by a mathematical model having at least one parameter of uncertain value, said system comprising:
  portfolio generating means having input means, said portfolio generating means:
  1) receiving a value for each of the parameters of uncertain value based on a scenario that may or is expected to occur via said input means;
  2) solving the model for each scenario to yield the best solution of the model for each scenario;
  3) receiving a probability value, representing the likelihood that the scenario will occur, for each solution of the model via the input means;
  4) determining a single solution to the mathematical model which best models the behavior of the target portfolio under the uncertainty defined by all of the scenarios considered using the values assigned to the parameters, the solutions of the model and the probabilities assigned to the solutions for all scenarios;
  5) selecting appropriate numbers of each of said second financial instruments as determined by said single solution;
  output means connected to said portfolio generating means, said output means providing a physical indication as to the selection of said second financial instruments to generate a portfolio of second instruments that best tracks the behavior of said target portfolio based on said single solution; and
  means for creating said portfolio of second instruments in accordance with said physical indication.

9. A system as defined in claim 8 wherein the value of said target portfolio is calculated at each scenario.

10. A method of replicating a target option from a plurality of financial instruments including traded options, said target option being represented by a mathematical model having at least one parameter of uncertain value, said method comprising the steps of:
  1) selecting a list of financial instruments to be used to replicate the said target option;
  2) specifying scenarios by assigning values to the parameters of uncertain value based on scenarios that may or are expected to occur;
  3) assigning a probability value to each scenario representing the likelihood that the scenario will occur;
  4) calculating the value of the target option for all of the scenarios considered;
  5) calculating the value of the selected financial instruments for all scenarios;
  6) calculating the optimal composition of financial instruments at each scenario and the cost thereof;
  7) calculating the optimal composition of financial instruments under all of the scenarios to yield a portfolio of financial instruments which tracks said target option; and
  8) creating a portfolio of financial instruments in accordance with said optimal composition of financial instruments under all scenarios.

11. A method as defined in claim 10 further comprising the step of specifying cost constraints and the optimization method used to perform steps 4 to 8 prior to performing step 4.

12. A method as defined in claim 11 further comprising the step of calculating the value of the optimal composition of the replicating portfolio at each scenario.

13. A method as defined in claim 12 wherein the parameters of uncertain value relate to volatility, interest rates, cost-of-carry and underlying asset prices.

14. A system for replicating a target portfolio of financial instruments from a plurality of second financial instruments, said target portfolio being defined by a mathematical model having at least one parameter of uncertain value, said system comprising:
  input means allowing a user to assign values to each of the parameters in each of the scenarios expected to occur and a probability value representing the likelihood that the scenario will occur;
  processing means in communication with said input means, said processing means solving the mathematical model for each scenario to yield the best solution of the model for that scenario and determining a single solution to the mathematical model which best tracks the behavior of the target portfolio under all of the scenarios, relative to the probabilities assigned to said scenarios;
  memory means for storing a list of second instruments, said processing means selecting appropriate numbers of each of said second instruments as determined by said single solution;
  output means connected to said processing means, said output means providing a physical indication as to the selection of said second instruments to generate a portfolio of second instruments that best tracks the behavior of said target portfolio; and
  means for creating said portfolio of second instruments in accordance with said physical indication.

15. A method of allocating resources in the optimal management of reservoirs in a hydroelectric system which accounts for the uncertainty in the future demand for the electricity, the uncertainty of water inflow to the reservoirs and the randomness in the functions describing the benefit of using hydroelectricity over thermal generation, said method comprising the steps of:
  1) defining a mathematical optimization model that maximizes the benefit of using hydroelectric generation over thermal generation subject to limits on the control of water released through turbines in said hydroelectric system and on water levels in the reservoirs and assuming known water inflow parameters, known electricity demand parameters and known hydro benefit function parameters;

2) defining scenarios for all parameters in said optimization model that are uncertain at future points in time;

3) assigning a value to each uncertain parameter in each of the said scenarios;

4) assigning a probability value to each defined scenario, said probability valve representing the likelihood that the scenario will occur;

5) determining a solution to the optimization model for each scenario using the values assigned to the uncertain parameters for said scenario;

6) determining a single solution to the optimization model which best tracks the desired behaviour of the hydroelectric system under all possible future scenarios, relative to the probabilities assigned to the future scenarios; and 7) setting reservoir levels and hydro releases in said hydroelectric system based on said single solution obtained.

16. A method as defined in claim 15 wherein step (6) is determined by using a tracking function.

17. A method as defined in claim 16 wherein said tracking function is of the form $$\text{Minimize} \quad \Sigma_s p_s \| c_s^T x - v_s \|^2 + \Sigma_s p_s \| A_s x - b_s \|^2$$
$$\text{subject to} \quad A_d x = b_d$$
$$x \geq 0$$
$$\text{and} \quad c^T x \leq C$$

where c is the current cost of the resource/financial instrument $x_j$ and C is the budget for replication/resource allocation.

18. A method as defined in claim 16 wherein said tracking function is of the form $$\text{Minimize} \quad \Sigma_s p_s (\| c_s^T x - v_s \| + \| A_s x - b_s \|)$$
$$x \geq 0$$
$$\text{subject to} \quad A_d x = b_d$$
$$\text{and} \quad c^T x \leq C$$

Where $\| \ldots \|$ denotes any one or two sided norm and where c is the current cost of the resource/financial instrument $x_j$ and C is the budget for replication/resource allocation.

* * * * *

UNITED STATES PATENT AND TRADEMARK OFFICE
CERTIFICATE OF CORRECTION

PATENT NO. : 5,148,365
DATED : September 15, 1992
INVENTOR(S) : Ron S. Dembo

It is certified that error appears in the above-indentified patent and that said Letters Patent is hereby corrected as shown below:

In the Drawing: Sheet of 8 (Figure 3) change "EXPECTED REQUESTS ON EACH ASSET" to -- EXPECTED PAYOUTS ON EACH ASSET__ .

Signed and Sealed this

Twenty-eighth Day of September, 1993

Attest:

BRUCE LEHMAN

*Attesting Officer*   *Commissioner of Patents and Trademarks*